Feb. 26, 1957 R. A. LIPSKI 2,782,670
TRAINING ATTACHMENTS FOR STRINGED INSTRUMENTS
Filed Nov. 12, 1953

INVENTOR.
RICHARD A. LIPSKI
BY
H. G. Manning
ATTORNEY

United States Patent Office 2,782,670
Patented Feb. 26, 1957

2,782,670

TRAINING ATTACHMENTS FOR STRINGED INSTRUMENTS

Richard A. Lipski, Terryville, Conn.

Application November 12, 1953, Serial No. 391,474

1 Claim. (Cl. 84—283)

This invention relates to musical instruments, and more particularly to a device to be detachably secured to a stringed instrument for insuring the correct use of the bow.

One object of the present invention is to provide a device of the above nature which will not substantially interfere with the playing or tone of the instrument.

A further object is to provide a device of the above nature which will be simple in construction, inexpensive to manufacture, easy to install and manipulate, ornamental in appearance, very efficient and durable in use, which will be light in weight, inconspicuous, and which will compel the beginner to draw his bow in a straight line at the proper distance from the bridge at right angles to the strings with the approved arm and wrist movement.

A further object is to provide a device of the above nature which, as the proficiency of the pupil increases, may be gradually dispensed with, and which will permit him to have comparative freedom of action, while serving to call his attention to any material deviation from the correct movement of the bow.

The improved training attachment comprises a pair of U-shaped guides connected to a pair of parallel side clips which are adapted to embrace the bridge and finger board of the stringed instrument.

With these and other objects in view, there had been illustrated on the accompanying drawing, one form in which the invention may conveniently be embodied in practice.

Figure 1:
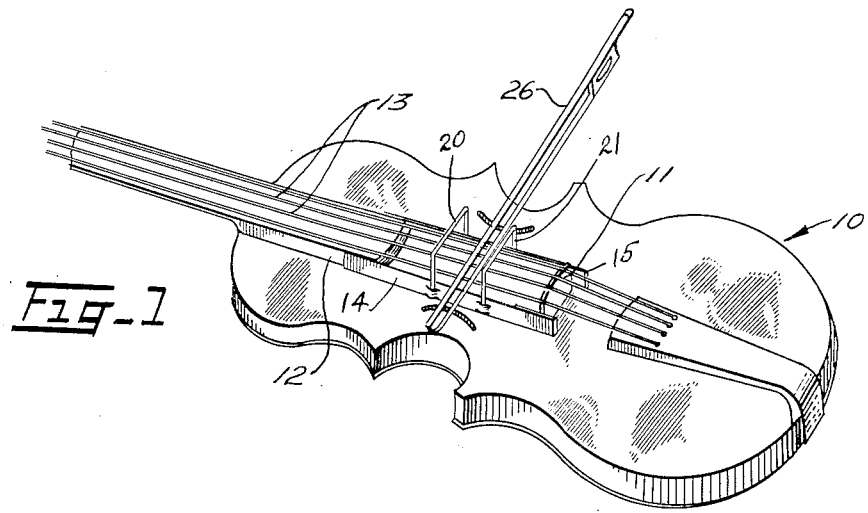
Fig. 1 represents a perspective view showing the appearance of the improved training device when attached to a violin, and illustrating the proper position of the bow between the guides of said training device.
Figure 2:
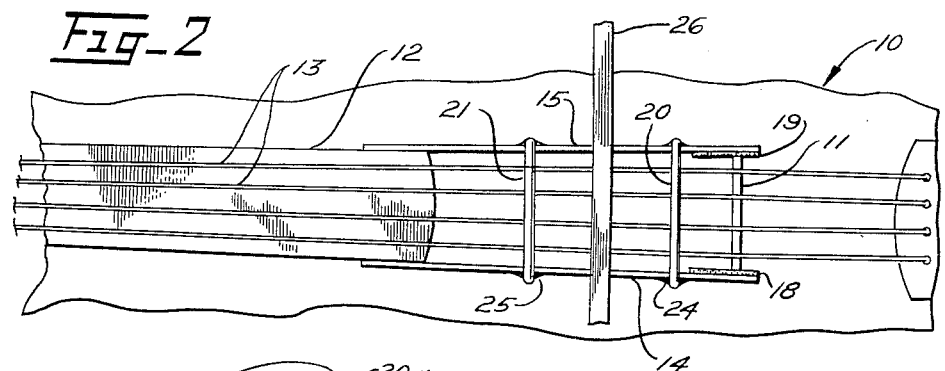
Fig. 2 is a fragmentary plan view of the same, on a larger scale.
Figure 3:
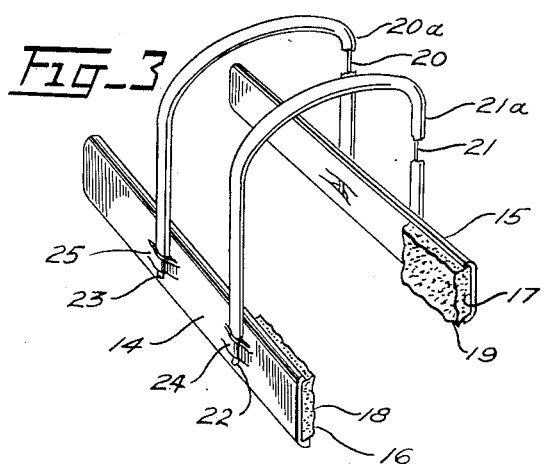
Fig. 3 is a perspective view of the training device shown by itself, detached from the instrument.

Referring now to the drawing, in which like reference numerals denote corresponding parts throughout the several views, the numeral 10 indicates a violin having a bridge 11, a fingerboard 12, and four strings 13, all of the usual construction.

The training attachment of the present invention includes a pair of rectangular, elongated channel-shaped side clips 14 and 15, preferably of metal, having inner recesses 16 and 17, said clips being detachably spring clamped on opposite sides of the bridge 11 and fingerboard 12. The bridge ends of the clips 14 and 15 are provided with a pair of short inner felt pads 18 and 19 for engaging the bridge 11. The use of these pads will reduce the muting of the sound of the instrument and prevent scratching of said bridge.

The clips 14 and 15 are connected together by a pair of upstanding U-shaped wire guide members 20 and 21, preferably having flat covers 20a and 21a of soft rubber. The lower ends 22, 23 of the wire guide members 20, 21 are detachably secured within a plurality of loops 24, 25 struck out from the metal of which the clips 14, 15 are constructed.

The numeral 26 indicates a bow which is located between the outstanding guide members 20, 21, at right angles to the strings 13, thereby compelling the beginner to use said bow correctly.

While there has been disclosed in this specification, one form in which the invention may be embodied, it will be understood that this form is shown for the purpose of illustration only, and that the invention is not to be limited to the specific disclosure, but may be modified and embodied in various other forms, without departing from its spirit. In short, the invention includes all the modifications and embodiments coming within the scope of the following claim.

Having thus fully described the invention, what is claimed as new, and for which it is desired to obtain Letters Patent, is:

In a bow guide for attachment to a violin or similar stringed instrument having a finger board and a bridge, a pair of parallel, inverted U-shaped rubber-covered wire guiding members secured at right angles to a pair of elongated vertical channel shaped side clips, said clips having inwardly extending upper and lower ribs detachably spring clamped upon the opposite sides of said finger board, and a pair of short felt pads for engagement with said bridge to prevent scratching thereof and to minimize the muting of the musical tone of the instrument during use.

References Cited in the file of this patent

UNITED STATES PATENTS

| | | |
|---|---|---|
| 1,192,030 | Ashley | July 25, 1916 |

FOREIGN PATENTS

| | | |
|---|---|---|
| 67,105 | Austria | Nov. 25, 1914 |
| 588,732 | France | Feb. 6, 1925 |